(12) United States Patent
Holloway

(10) Patent No.: US 6,440,038 B1
(45) Date of Patent: Aug. 27, 2002

(54) METHOD AND SYSTEM FOR MANAGING TORQUE OF A DRIVETRAIN

(75) Inventor: Eric A. Holloway, Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 36 days.

(21) Appl. No.: 09/584,949

(22) Filed: Jun. 1, 2000

(51) Int. Cl.[7] ............................................. B60K 41/04
(52) U.S. Cl. .......................... 477/54; 477/110; 477/111
(58) Field of Search ........................... 477/54, 110, 111; 701/54

(56) References Cited

U.S. PATENT DOCUMENTS

| | | |
|---|---|---|
| 3,964,347 A | 6/1976 | Ahlen |
| 5,072,631 A | 12/1991 | Fujimoto et al. |
| 5,186,081 A | 2/1993 | Richardson et al. |
| 5,343,780 A | 9/1994 | McDaniel et al. .......... 477/108 |
| 5,477,827 A | 12/1995 | Weisman, II et al. ....... 123/436 |
| 5,483,927 A | 1/1996 | Letang et al. ............ 123/41.12 |
| 5,623,408 A | 4/1997 | Motamedi et al. |
| 5,738,606 A | 4/1998 | Bellinger .................... 477/111 |
| 5,746,679 A | 5/1998 | Minowa et al. ............... 477/92 |
| 5,876,302 A | 3/1999 | Palmeri ..................... 477/111 |
| 5,935,042 A | 8/1999 | Thomas et al. ............. 477/110 |
| 5,989,154 A * | 11/1999 | Christensen et al. ........ 477/111 |
| 6,083,139 A * | 7/2000 | Deguchi et al. ............ 477/174 |
| 6,186,925 B1 * | 2/2001 | Bellinger .................... 477/175 |

* cited by examiner

*Primary Examiner*—Sherry Estremsky
(74) *Attorney, Agent, or Firm*—Woodard, Emhardt, Naughton, Moriarty & McNett

(57) ABSTRACT

A system is disclosed for implementing a technique for managing torque of a drivetrain. The drivetrain includes an air intake passage having a throttle valve, an internal combustion engine having an output shaft, a transmission having an output shaft, and a rotational propulsion member operatively coupled to the transmission by a propeller shaft and a drive axle. The system includes a throttle valve sensor, an engine speed sensor, a transmission speed sensor, a vehicle speed sensor, a transmission controller, and an engine controller. The throttle position sensor provides a throttle position signal that is indicative of a rotational position of the throttle valve. The engine speed sensor provides an engine speed signal that is indicative of a rotational speed of the engine output shaft. The transmission speed sensor provides a transmission speed signal that is indicative of a rotational speed of the transmission output shaft. The vehicle speed sensor provides a vehicle speed signal indicative of a rotational speed of the rotating propulsion member. The transmission controller provides a transmission operation signal that is indicative of an operating state of the transmission. The engine controller is response to all of the signals to provide a fueling meter signal to a fueling system that is indicative of a level of fuel to be supplied to the engine. The engine output shaft generates a torque in response to the fueling meter signal that is within the torque capacity of each component of the drivetrain.

29 Claims, 10 Drawing Sheets

METHOD AND SYSTEM FOR MANAGING TORQUE OF A DRIVETRAIN

TECHNICAL FIELD OF THE INVENTION

The present invention generally relates to engine control systems, and more specifically, but not exclusively, relates to a technique for managing torque of a drivetrain based upon the operating state of an associated transmission.

BACKGROUND OF THE INVENTION

The front end of a drivetrain for a vehicle primarily comprises an internal combustion engine (hereinafter "engine"), and a transmission having a torque converter operatively coupled to an output shaft of the engine. For such vehicles also having an electronically controlled fueling system, a controller utilizes a first torque curve for direct drive gear ratios when computing a fueling meter signal for the fueling system and utilizes a second lower torque curve for other gear ratios when computing the fueling meter signal. Consequently, the gears of the transmission are protected from structural damage or destruction due to an inordinate amount of torque being applied to the torque converter from the engine output shaft. To protect additional drivetrain components downstream from the transmission, both torque curves can be mapped in view of the lowest maximum torque capacity of a downstream component. Alternatively, in addition to computing a fueling meter signal from the appropriate torque curve, the controller can compute a separate fueling meter signal for each downstream component as a function of the maximum torque capacity of each downstream component, and then provide the lowest computed fueling meter signal to the fueling system. However, this technique for computing a fueling meter signal does not address a need to protect the transmission whenever the torque converter is in a stall or high slip condition. The present invention addresses this need, and provides other important benefits and advantages.

SUMMARY OF THE INVENTION

The present invention relates to a technique for managing torque of an internal combustion engine based upon the operating state of an associated transmission. Various aspects of the present invention are novel, nonobvious, and provide various advantages. While the actual nature of the invention covered herein can only be determined with reference to the claims appended hereto, certain features which are characteristic of the preferred embodiment disclosed herein are described briefly as follows.

One embodiment of the present invention is a unique engine control system. Other embodiments include, but are not limited to, unique methods and devices to regulate torque in a drivetrain.

A further embodiment includes a unique technique to manage torque capacity relative to a torque converter of an automatic transmission.

A still further embodiment includes a unique technique to limit torque developed in a drivetrain including an engine mechanically coupled to a transmission. The torque limit is at least partially determined in accordance with the gear ratio of the transmission. In one form of this embodiment, torque limit is selected as the lowest of a number of different possible limits.

One object of the present invention is to provide an improved torque management technique.

Another object of the present invention is to provide a torque management technique for computing a fueling meter signal corresponding to the maximum torque capacity.

Further embodiments, forms, objects, features, aspects, benefits, and advantages will become apparent from the drawings and description contained herein.

DESCRIPTION OF THE PREFERRED EMBODIMENT

Figure 1:
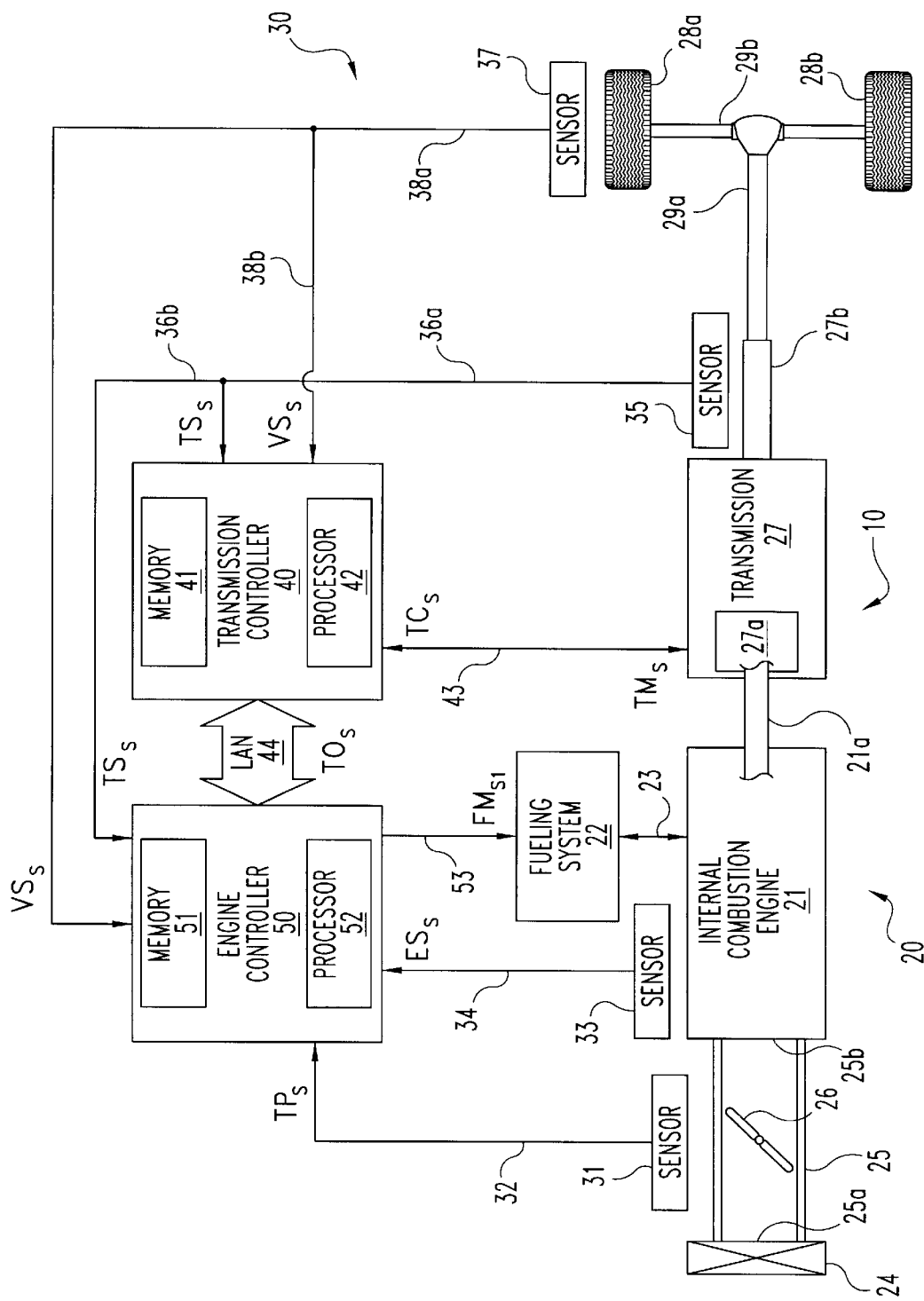
FIG. 1 is a diagrammatic illustration of one embodiment of a vehicle system of the invention.

For the purposes of promoting an understanding of the principles of the present invention, reference will now be made to the embodiments illustrated in the drawings and specific language will be used to describe the same. It will nevertheless be understood that no limitation of the scope of the present invention is thereby intended. Any alterations and further modifications in the illustrated embodiments, and any further applications of the principles of the present invention as illustrated herein being contemplated as would normally occur to one skilled in the art to which the present invention relates.

Referring now to FIG. 1, one embodiment of a torque management system 30 in accordance with the present invention is shown. Torque management system 30 executes a technique for managing torque of a drivetrain 20 for a vehicle 10. Vehicle 10 can be a truck or any other type of vehicle. The present description of drivetrain 20 is directed to the primary components of drivetrain 20 directly interacting with system 30, with standard components not being specifically described as would be known to those skilled in the art. Drivetrain 20 comprises internal combustion engine 21 (hereinafter "engine 21"), a fueling system 22, an air filter 24, and an air intake passage 25. Engine 21 is of the four stroke diesel-fueled type with Compression Ignition (CI). However, engine 21 can be a different type of engine as would occur to one skilled in the art, e.g. a two stroke diesel-fueled types, a Spark Ignition (SI) type of engine, a gaseous or gasoline fueled type, etc. For the illustrated embodiment of engine 21, fueling system 22 supplies fuel by a fuel pathway 23 to engine 21. Fuel pathway 23 represents one or more fuel lines, signal paths, and/or other type of engine connections associated with conventional fueling systems. Fueling system 22 includes a fuel source (not shown) such as a fuel tank, and controls the delivery of fuel for combustion in engine 21. Preferably, engine 21 is configured for port-injection fueling, and fueling system 22 includes electronically controlled fuel injectors. Alternatively, other fueling arrangements may be utilized as would occur to one skilled in the art.

Air filter 24 is in fluid communication with an inlet 25a of air intake passage 25, and engine 21 is in fluid communication with an outlet 25b of air intake passage 25. A throttle valve 26 is positioned within and rotatably coupled to air intake passage 25. Throttle valve 26 has a rotational position range between 0% at one extreme and 100% at the other extreme. The flow rate of any air passing through air filter 24 and air intake passage 25 into engine 21 is regulated by a rotational position of throttle valve 26 that is established in response to an operation of an accelerator pedal (not shown).

Drivetrain 20 further comprises transmission 27 and a pair of rotating propulsion members in the form of ground engaging wheels 28a and 28b. An output shaft 21a of engine 21 is operatively coupled to a torque converter 27a of transmission 27. Transmission 27 is a combination mechanical and shift-by-wire type of automatic transmission. However, transmission 27 can be a different type of transmission as would occur to one skilled in the art, e.g. a mechanical type of automatic transmission, a shift-by-wire type of transmission, a manual transmission, etc. A propeller shaft 29a is rotatably coupled to an output shaft 27b of transmission 27. A drive axle 29b is rotatably coupled to propeller shaft 29a, wheel 28a, and wheel 28b. Engine 21 is the prime mover for drivetrain 20 that provides mechanical power to torque converter 27a via output shaft 21a. Torque converter 27a amplifies the torque produced by engine 21 and transmits the amplified engine torque to the engaged gear of the transmission whereby propeller shaft 29a, drive axle 29b, wheel 28a and wheel 28b are rotated.

Still referring to FIG. 1, system 30 comprises a throttle position sensor 31, an engine speed sensor 33, a transmission speed sensor 35, a vehicle speed sensor 37, a transmission controller 40, and an engine controller 50. Throttle position sensor 31 is operatively coupled to engine controller 50 by a signal path 32. Throttle position sensor 31 is a conventional magnetic sensor positioned with respect to throttle valve 26 to provide a throttle position signal $TP_S$ to engine controller 50 via signal path 32. Throttle position signal $TP_S$ is an indication of a rotational position of throttle valve 26. Alternatively or additionally, throttle position signal $TP_S$ can be derived from a detected rotational position of an accelerator pedal (not shown) which can be manually operated or electronically operated by a cruise control system as taught by commonly owned U.S. Pat. No. 5,738,606, that is hereby incorporated by reference.

Engine speed sensor 33 is operatively coupled to engine controller 50 by a signal path 34. Engine speed sensor 33 is a conventional magnetic sensor positioned with respect to a crankshaft (not shown) of engine 21 to provide an engine speed signal $ES_S$ to engine controller 50 via signal path 34. Engine speed signal $ES_S$ is an indication of the rotational speed of the crankshaft of engine 21. Engine speed sensor 33 can alternatively be positioned with respect to output shaft 21a to provide engine speed signal $ES_S$.

Transmission speed sensor 35 is operatively coupled to transmission controller 40 by a signal path 36a. Transmission speed sensor 35 is a conventional magnetic sensor positioned within respect to an output shaft 27b of transmission shaft 27 to provide a transmission speed signal $TS_S$ to transmission controller 40 via signal path 36a. Transmission speed signal $TS_S$ is an indication of a rotational speed of output shaft 27b of transmission shaft 27. Transmission speed sensor 35 can alternatively be positioned with respect to propeller shaft 29a to provide transmission speed signal $TS_S$.

Vehicle speed sensor 37 is operatively coupled to engine controller 50 by a signal path 38a. Vehicle speed sensor 37 is preferably a known type of magnetic sensor positioned relative to wheel 28a to provide a vehicle speed signal $VS_S$ to engine controller 50 via signal path 38a. Vehicle speed signal $VS_S$ is an indication of a rotational speed of wheel 28a. Alternatively or additionally, transmission controller 40 can conventionally compute transmission speed signal $TS_S$ as a function of vehicle speed signal $VS_S$, a diameter of wheel 28a, and a diameter of drive axle 29b.

In other embodiments of the present invention, throttle position signal $TP_S$, engine speed signal $ES_S$, transmission speed signal $TS_S$ and/or vehicle speed signal $VS_S$ can be provided by other types of sensors.

Still referring to FIG. 1, transmission controller 40 and engine control 50 are preferably electronic subsystems, each being comprised of one or more components of a common engine control unit (hereinafter "the common ECU") (not shown) that is powered by a battery (not shown). Transmission controller 40 and engine controller 50 may include digital circuitry, analog circuitry, and/or hybrid circuitry. Transmission controller 40 and engine controller 50 can include multiple components that are physically positioned at different locations within vehicle 10. In the illustrated embodiment, transmission controller 40 includes a memory 41 and a central processing unit 42 (hereinafter "CPU 42"), and engine controller includes a memory 51 and a central processing unit 52 (hereinafter "CPU 52").

Memory 41 and memory 51 are of the solid-state electronic variety, and may be embodied in one or more components. In other embodiments, memory 41 and memory 51 may alternatively or concurrently include magnetic or optical types of memory. Memory 41 and memory 51 can be volatile, nonvolatile, or a combination of both volatile and nonvolatile types of memory. While it is preferred that memory 41 be integrally included in the common ECU and memory 51 be remotely distributed for access via a local area network 44 (hereinafter "LAN 44"), in other embodiments, memory 41 is remotely distributed for access via LAN 44 and/or memory 51 is integrally included in the common ECU. In still other embodiments, memory 41 and memory 51 are provided by a single integral memory.

CPU 42 is configured to access memory 41 and is mounted on the common ECU. CPU 42 is a programmable, microprocessor-based device that executes instructions stored in memory 41, and accesses memory 41 to read or write data in accordance with the instructions. CPU 52 is configured to access memory 51 and is remotely distributed for access via LAN 44. CPU 52 is a programmable, microprocessor-based device that executes instructions stored in memory 51, and accesses memory 51 to read or write data in accordance with the instructions. In other embodiments, CPU 42 is remotely distributed for access via LAN 44 and/or CPU 52 is integrally included in the common ECU. In yet other embodiments, CPU 42 and/or CPU 52 can alternatively be implemented as a dedicated state machine, or a hybrid combination of programmable and dedicated hardware. In still other embodiments, transmission controller 40 and engine controller 50 are provided by a single integral processing unit. Transmission controller 40 and engine controller 50 further include any interfaces, control clocks, signal conditioners, signal converters, filters, communication ports, or any other type of operators as would occur to one skilled in the art to implement the principles of the present invention.

Still referring to FIG. 1, transmission controller 40 is operatively coupled to transmission 27 by signal path 43 to exchange a plurality of transmission management signals $TM_S$ for managing the operation of transmission 27, and a plurality of transmission condition signals $TC_S$ that are indicative of the operating conditions of transmission 27. It is to be appreciated that transmission speed signal $TS_S$ is one of the plurality of transmission condition signal $TC_S$ that is shown separately for purposes of describing the present invention. Engine controller 50 is operatively coupled to transmission controller 40 by LAN 44 to receive a transmission operation signal $TO_S$ that is indicative of an operative status of transmission 27.

Transmission speed sensor 35 preferably is operatively coupled to engine controller 50 by a signal path 36b to provide transmission speed signal $TS_S$ to engine controller 50. In other embodiments, transmission controller 40 can alternatively or additionally communicate transmission speed signal $TS_S$ to engine controller 50 through transmission operation signal $TO_S$. Vehicle speed sensor 37 is operatively coupled to transmission controller 40 by a signal path 38b to provide vehicle speed signal $VS_S$ to transmission controller 40. In other embodiments, engine controller 50 can alternatively or additionally communicate vehicle speed signal $VS_S$ to transmission controller 40 via LAN 44.

Engine controller 50 is also operatively coupled to fueling system 22 by a signal path 53 to provide a fueling meter signal $FM_{S1}$ that is indicative of a level of fuel to be supplied to engine 21 for combustion. Specifically, an active fuel injector (not shown) of fueling system 22 conventionally expels fuel therefrom at a fixed rate. Fueling meter signal $FM_{S1}$ informs fueling system 22 of a fixed length of time to activate the fuel injector such that a desired level of fuel is supplied to engine 21 for combustion.

Figure 2:
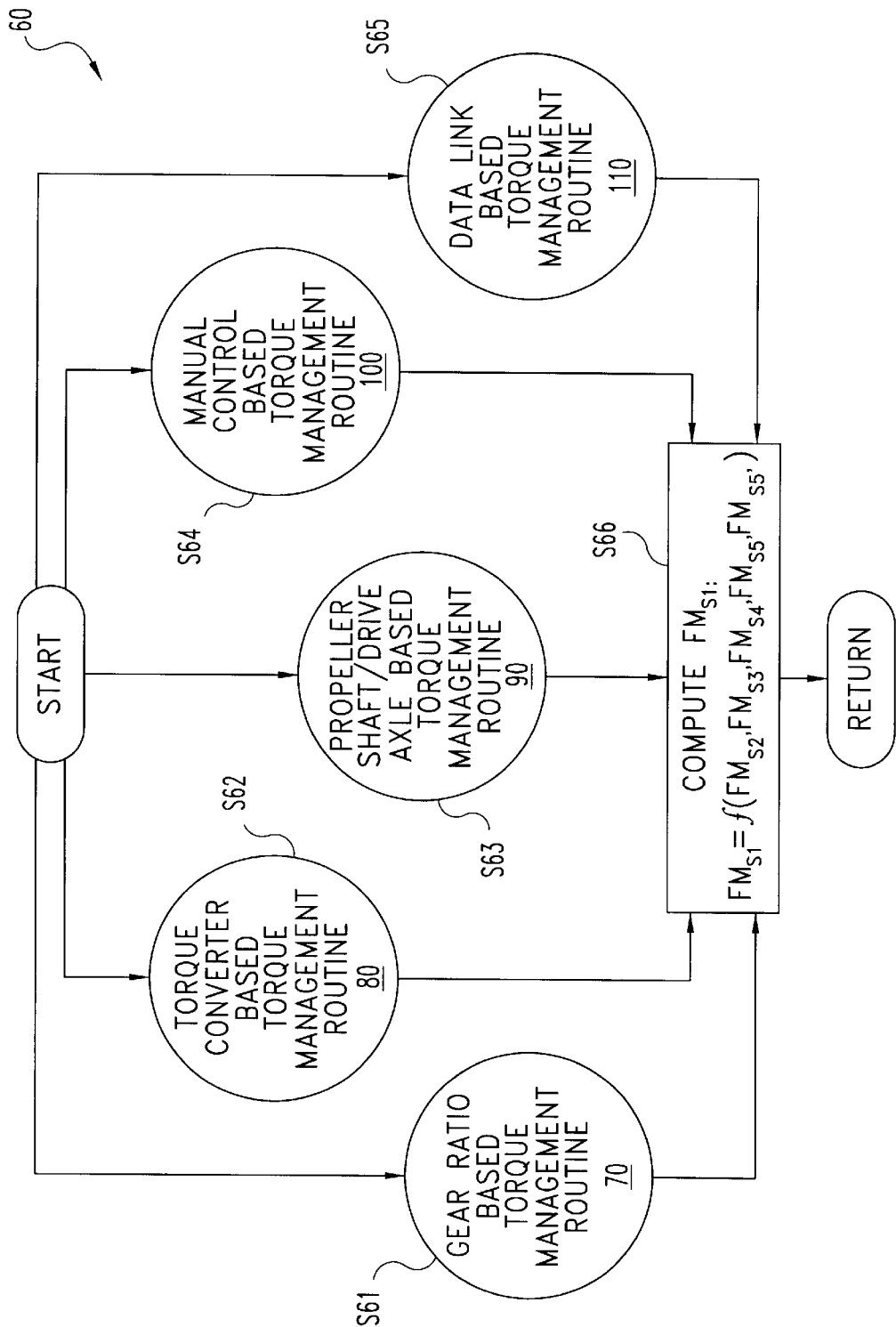
FIG. 2 is a flow chart illustrating an engine torque control routine as executed by an engine controller of the FIG. 1 system.

Referring to FIG. 2, one embodiment of an engine torque control routine 60 for implementing a technique for managing torque of drivetrain 20 (FIG. 1) is shown. In stage S61 of routine 60, engine torque control routine 60 executes a gear ratio based torque management routine 70 for computing a fueling meter signal $FM_{S2}$ as a function (f) of a gear ratio of transmission 27 (FIG. 1) and engine speed signal $ES_S$ (FIG. 1). The preferred computation method of fueling meter signal $FM_{S2}$ is subsequently explained herein in connection with a description of FIGS. 3A–3D. In stage S62 of routine 60, engine torque control routine 60 executes a torque converter based torque management routine 80 for computing a fueling meter signal $FM_{S3}$ as a function f) of transmission speed signal $TS_S$ (FIG. 1) and throttle position signal $TP_S$ (FIG. 1). The preferred computation method of fueling meter signal $FM_{S3}$ is subsequently explained herein in connection with a description of FIGS. 4A and 4B.

In stage S63 of routine 60, engine torque control routine 60 executes a propeller shaft/drive axle based torque management routine 90 for computing a fueling meter signal $FM_{S4}$ as a function (f) of the lowest maximum torque capacity of either propeller shaft 29a (FIG. 1) or drive axle 29b (FIG. 1). The preferred computation method of fueling meter signal $FM_{S4}$ is subsequently explained herein in connection with a description of FIG. 5. In stage S64 of routine 60, engine torque control routine 60 executes a manual control based torque management routine 100 for computing a fueling meter signal $FM_{S5}$ as a function (f) of a drivetrain torque calibration signal $DTC_{S1}$. The preferred computation method of fueling meter signal $FM_{S5}$ is subsequently explained herein in connection with a description of FIG. 6. In stage S65 of routine 60, engine torque control routine 60 executes a data link based torque management routine 110 for computing a fueling meter signal $FM_{S6}$ as a function (f) of drivetrain torque calibration signal $DTC_{S2}$. The preferred computation method of fueling meter signal $FM_{S6}$ is subsequently explained herein in connection with a description of FIG. 7.

Referring still to FIG. 2, stages S61–S65 are sequentially or preferably, concurrently executed. Upon completion of stages S61–S65, engine torque control routine 60 proceeds to stage S66 to compute fueling meter signal $FM_{S1}$ (FIG. 1) as a function (f) of fueling meter signal $FM_{S2}$, fueling meter signal $FM_{S3}$, fueling meter signal $FM_{S4}$, fueling meter signal $FM_{S5}$, and fueling meter signal $FM_{S6}$. In one embodiment, fueling meter signal $FM_{S1}$ is set to equal the lowest value between and among fueling meter signal $FM_{S2}$, fueling meter signal $FM_{S3}$, fueling meter signal $FM_{S4}$, fueling meter signal $FM_{S5}$, and fueling meter signal $FM_{S6}$. Fueling meter signal $FM_{S1}$ is then conditioned as necessary and provided to fueling system 22 (FIG. 1). Engine torque control routine 60 is executed at least once within every combustion cycle of engine 21 (FIG. 1) to timely provide fueling meter signal $FM_{S1}$ to fueling system 22. In one embodiment, engine torque control routine 60 is executed every forty (40) milliseconds.

With the succeeding description of FIGS. 3A–6, it is to be appreciated that, in response to fueling meter signal $FM_{S1}$, fueling subsystem 22 will supply fuel to engine 21 (FIG. 1) to generate an engine torque that is within the maximum torque limit of an engaged gear of transmission 27, torque converter 27a, propeller shaft 29a (FIG. 1), drive axle 29b (FIG. 1), and any additional downstream components (not shown) of drivetrain 20 (FIG. 1).

Figure 3A:
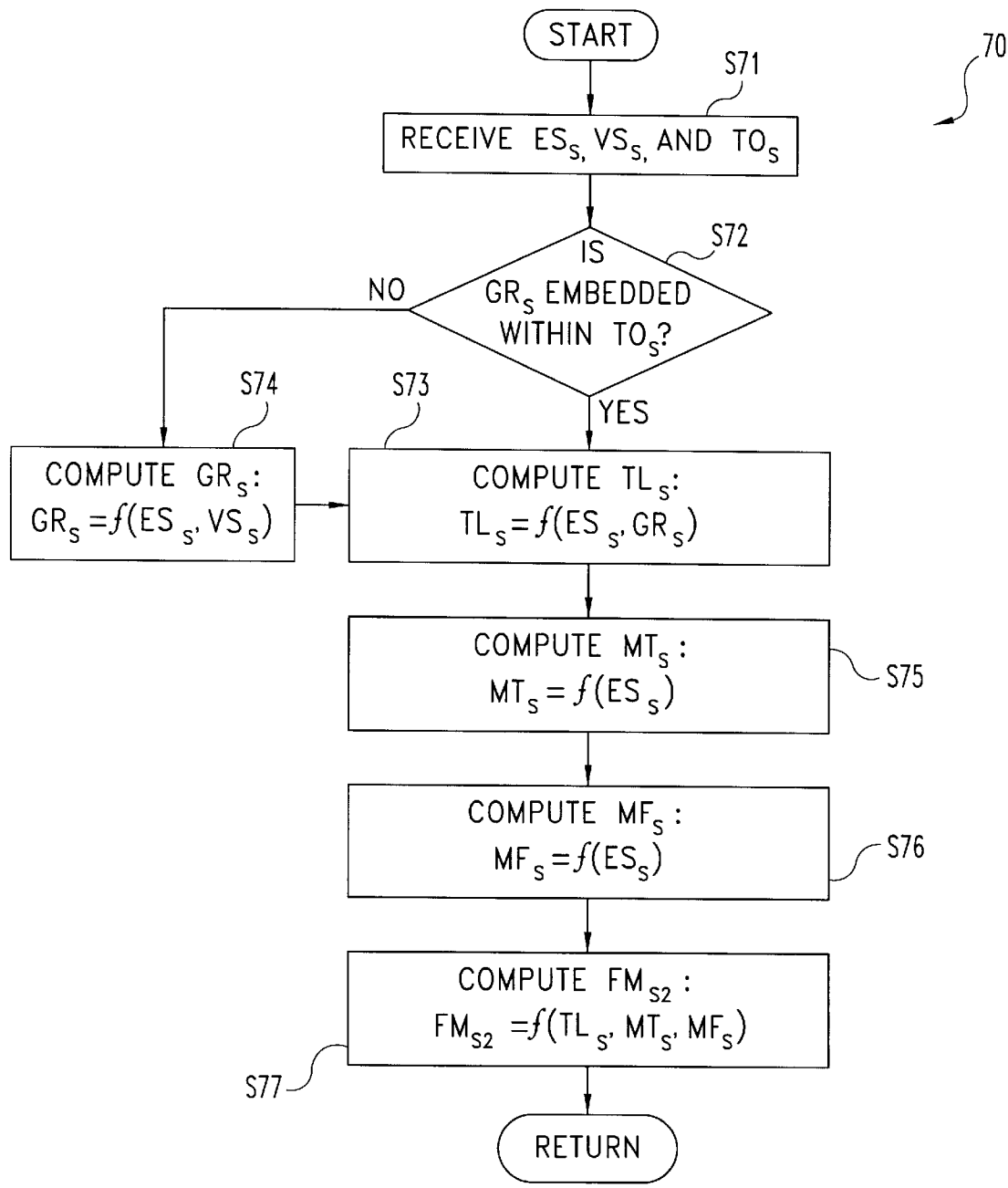
FIG. 3A is a flow chart illustrating a gear ratio based torque management routine as executed by the engine controller of the FIG. 1 system.

Referring to FIGS. 3A, a preferred embodiment of gear ratio based torque management routine 70 (FIG. 2) as stored in memory 51 (FIG. 1) and executed by CPU 52 (FIG. 1) will now be described herein. In stage S71 of routine 70, engine controller 50 (FIG. 2) receives and stores engine speed signal $ES_S$ (FIG. 1), vehicle speed signal $VS_S$ (FIG. 1), and transmission operation signal $TO_S$ (FIG. 1) within memory 51, and then proceeds to stage S72. In stage S72 of routine 70, CPU 52 determines if a gear ratio signal $GR_S$ is embedded within transmission operation signal $TO_S$, where gear ratio signal $GR_S$ is indicative of an engaged gear of transmission 27. If CPU 52 determines that gear ratio signal $GR_S$ is embedded within transmission operation signal $TO_S$, CPU 52 proceeds to stage S73 to compute a torque limit signal $TL_S$ as a function (f) of engine speed signal $ES_S$ and the embedded gear ratio signal $GR_S$. In one embodiment, a map or look-up table of torque limit signal $TL_S$ as related to engine speed signal $ES_S$ and embedded gear ratio signal $GR_S$ is stored within memory 51, and the appropriate value for torque limit signal $TL_S$ is retrieved therefrom by CPU 52. A graphical view illustrating a one embodiment of such a map is shown in FIG. 3B.

Figure 3B:
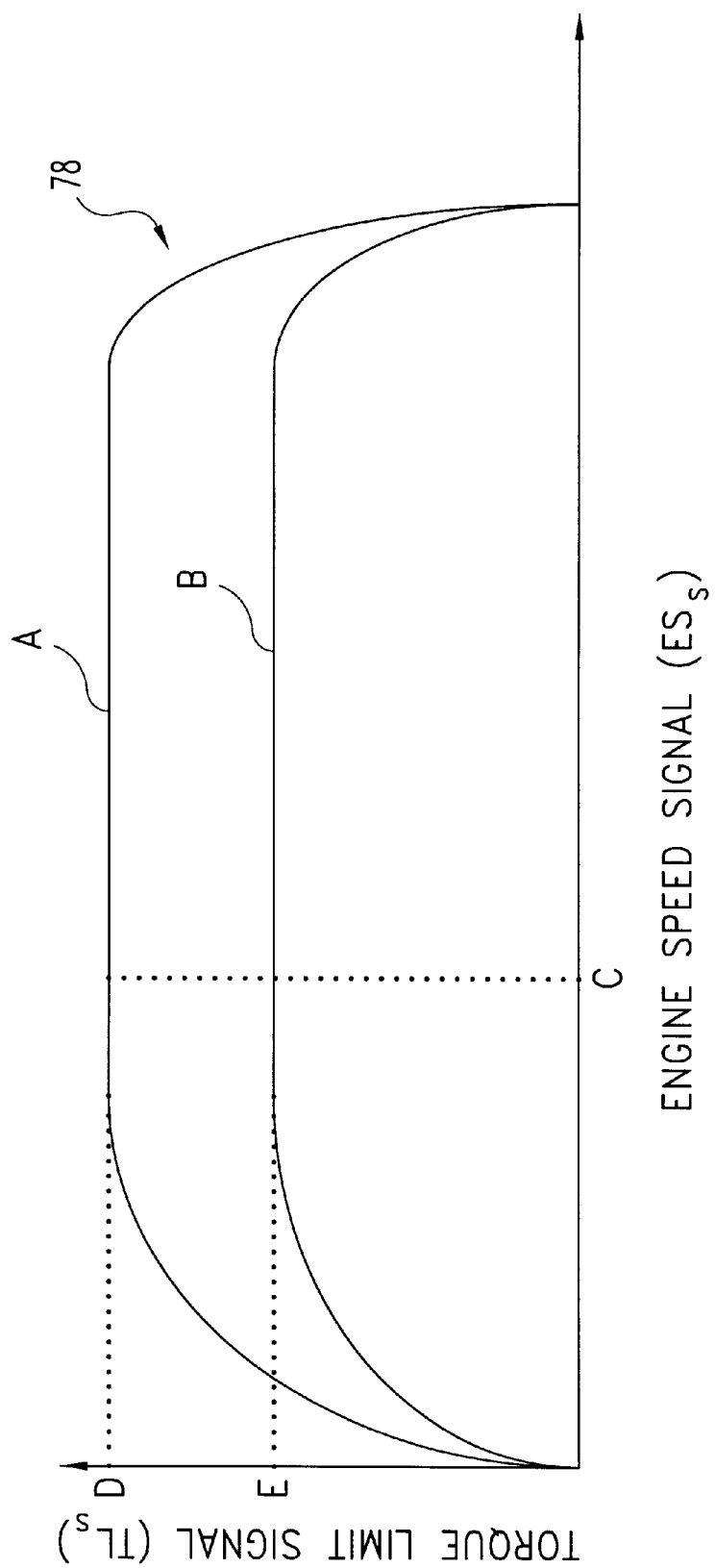
FIG. 3B is a graphical view of a pair of curves of torque limit versus engine speed for an internal combustion engine of the FIG. 1 system.

Referring to FIG. 3B, a map 78 has engine speed signal $ES_S$ taken along the abscissa (x axis) and torque limit signal $TL_S$ taken along the ordinate (y axis). Torque limit curve A of FIG. 3B relates torque limit signal $TL_S$ to both engine speed signal $ES_S$ and direct drive gear ratios of transmission 27 (FIG. 1). The value for torque limit signal $TL_S$ is therefore retrieved from curve A when embedded gear ratio signal $GR_S$ indicates transmission 27 is engaged in a direct drive gear ratio. Torque limit curve B of FIG. 3B relates torque limit signal $TL_S$ to both engine speed signal $ES_S$ and non-direct drive gear ratios of transmission 27. The value for torque limit signal $TL_S$ is therefore retrieved from curve B when embedded gear ratio signal $GR_S$ indicates transmission 27 is engaged in a non-direct drive gear ratio. Turning to an illustrated example, if embedded gear ratio signal $GR_S$ indicates transmission 27 is engaged in a direct drive gear ratio and engine speed signal $ES_S$ is at a level C, then torque limit signal $TL_S$ is retrieved by CPU 52 at a value D as shown. Also by illustrated example, if embedded gear ratio signal $GR_S$ indicates transmission 27 is engaged in a non-direct drive gear ratio, then torque limit signal $TL_S$ is retrieved by CPU 52 at a value E as shown. In another embodiment, a torque limit curve can be generated for each gear ratio of transmission 27. In yet another embodiment, a torque limit curve can be generated for any subset of gear ratios of transmission 27, and any number of subsets of gear ratios can be established.

Referring back to FIG. 3A, if CPU 52 determines that gear ratio signal $GR_S$ is not embedded within transmission operation signal $TO_S$, CPU 52 proceeds to stage S74 to conventionally compute gear ratio signal $GR_S$ as a function (f) of engine speed signal $ES_S$ and vehicle speed signal $VS_S$. CPU 52 then proceeds to stage S73 to compute torque limit signal $TL_S$ as a function (f) of engine speed signal $ES_S$ and the computed gear ratio signal $GR_S$. Computed gear ratio signal $GR_S$ substitutes for the embedded gear ratio signal $GR_S$ of transmission operation signal $TO_S$ during the computation for torque limit signal $TL_S$ as previously described herein in connection with FIG. 3B.

Figure 3C:
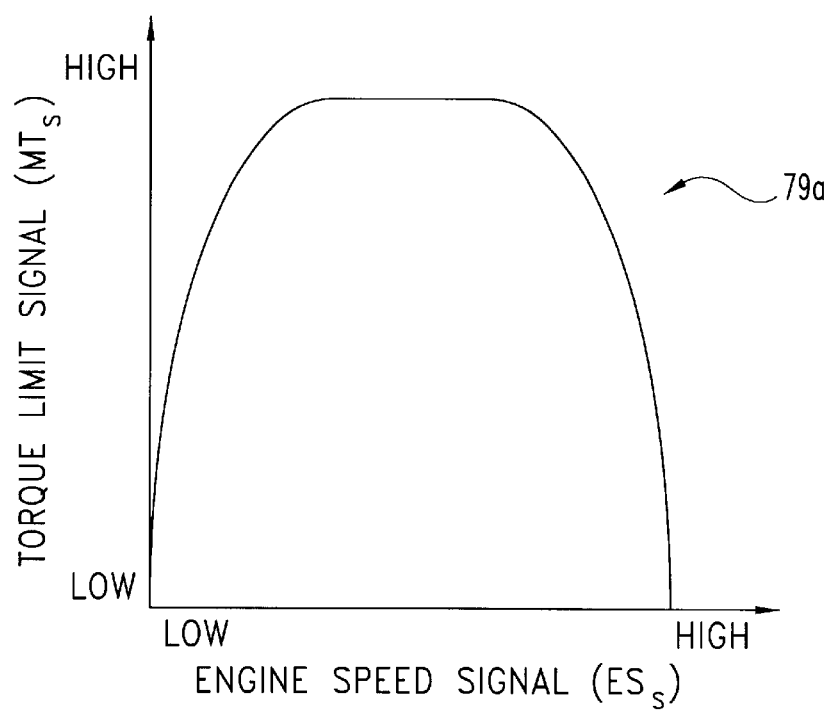
FIG. 3C is a graphical view of a curve of maximum torque versus engine speed for the internal combustion engine of the FIG. 1 system.

In stage S75 of routine 70, CPU 52 computes a maximum torque signal $MT_S$ as a function (f) of engine speed signal $ES_S$. Maximum torque signal $MT_S$ is indicative of the maximum amount of torque output shaft 21a of engine 21 (FIG. 1) delivers for the detected level of engine speed signal $ES_S$. In one embodiment, a map or look-up-table relating maximum torque signal $MT_S$ to engine speed signal $ES_S$ is stored within memory 51. The appropriate value for maximum torque signal $MT_S$ is retrieved therefrom by CPU 52. A graphical view illustrating a map 79a having engine speed signal $ES_S$ taken along the abscissa (x axis) and maximum torque signal $MT_S$ taken along the ordinate (y axis) is shown in FIG. 3C. CPU 52 is sequentially executes stage S75 after stage S73 or preferably, concurrently executes stage S75 with stage S73.

Figure 3D:
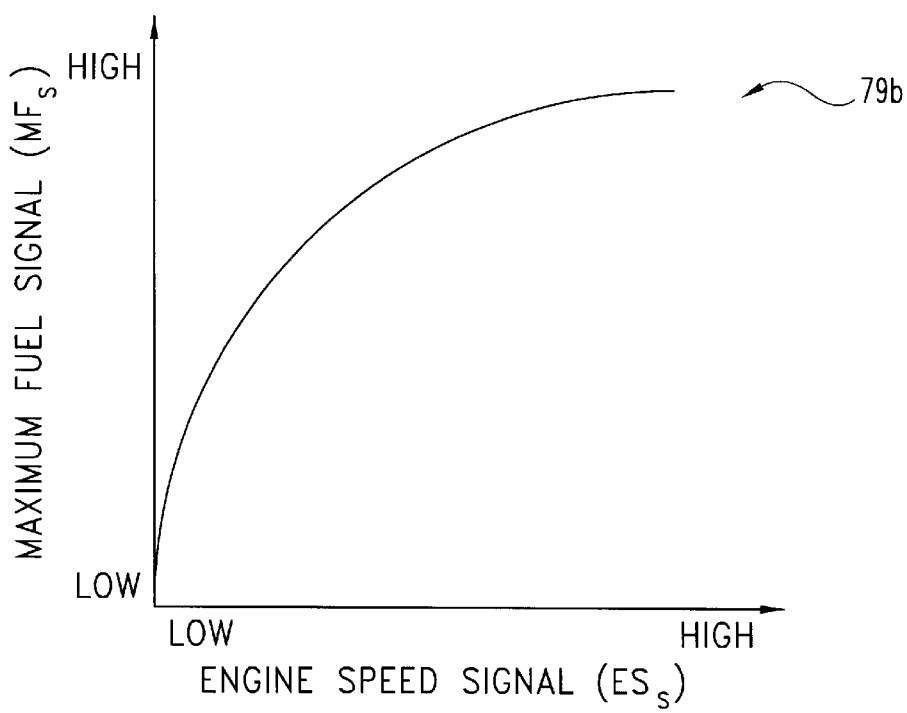
FIG. 3D is a graphical view of a curve of maximum fuel versus engine speed for the internal combustion engine of the FIG. 1 system.

CPU 52 proceeds to stage S76 to compute a maximum fuel signal $MF_S$ as a function (f) of engine speed signal $ES_S$. Maximum fuel signal $MF_S$ is indicative of the maximum amount of fuel required by engine 21 whereby engine output shaft 21a can generate the maximum amount of torque for the detected level of engine speed signal $ES_S$. In one embodiment, a map or lookup table relating maximum fuel signal $MF_S$ to engine speed signal $ES_S$ is stored within memory 51. The appropriate value for maximum fuel signal $MF_S$ is retrieved therefrom by CPU 52. A graphical view illustrating a map 79b having engine speed signal $ES_S$ taken along the abscissa (x axis) and maximum fuel signal $MF_S$ taken along the ordinate (y axis) is shown in FIG. 3D.

Referring back to FIG. 3A, upon completion of stage S73 and stage S76, CPU 52 proceeds to stage S77 to compute fuel metering signal $FM_{S2}$ as a function (f) of torque limit signal $TL_S$, maximum torque signal $MT_S$, and maximum fuel signal $MF_S$. In one embodiment, fueling meter signal $FM_{S2}$ is computed during stage S77 in accordance with the following equation (1):

$$FM_{S2}=(TL_S/MT_S)*MF_S \quad (1)$$

It is to be appreciated that the level of computed torque limit signal $TL_S$ for direct drive gear ratios of transmission 27 (FIG. 1) corresponds to the maximum torque capacities for the direct drive gear ratios, and the level of computed torque limit signal $TL_S$ for non-direct drive gear ratios of transmission 27 corresponds to the maximum torque capacities for the non-direct drive gear ratios. Consequently, fueling subsystem 22 will supply fuel to engine 21 in accordance with fuel metering signal $FM_{S2}$ to apply a torque to torque converter 27a with shaft 21a of engine 21 (FIG. 1) that is within the torque capacity of an engaged gear of transmission 27.

Referring to FIGS. 1 and 3A, for an alternative embodiment where transmission controller 40 and engine controller 50 are integrated into one controller or as part of a computer, transmission condition signal $TC_S$ can be received by the one controller or the computer in lieu of transmission operation signal $TO_S$. Routine 70 is then executed as previously described herein with the substitution of transmission condition signal $TC_S$ for transmission operation signal $TO_S$.

Figure 4A:
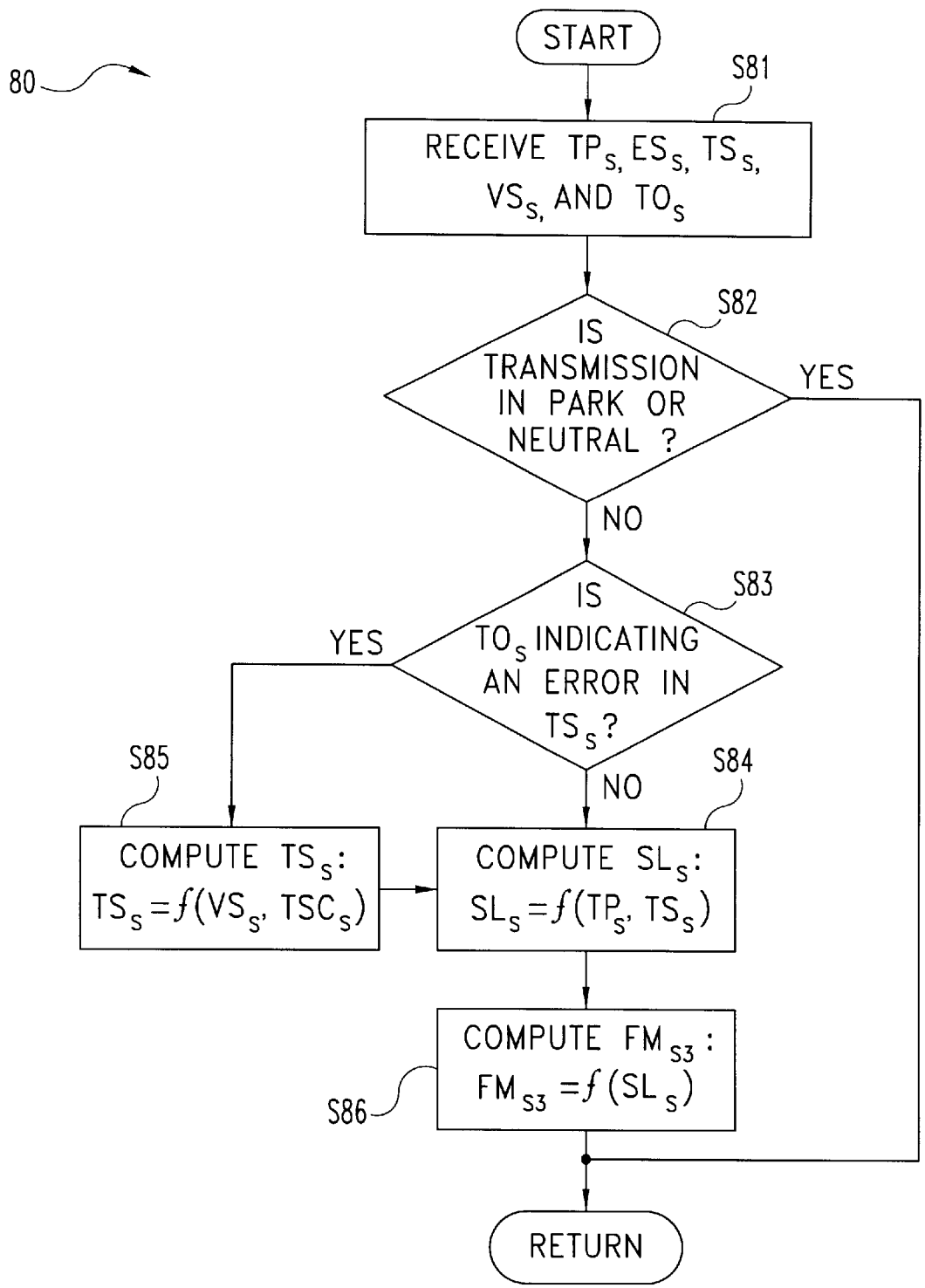
FIG. 4A is a flow chart illustrating a torque converter based torque management routine as executed by the engine controller of the FIG. 1 system.

Referring to FIG. 4A, a preferred embodiment of torque converter based torque management routine 80 (FIG. 2) as stored in memory 51 (FIG. 1) and executed by CPU 52 (FIG. 1) will now be described herein. In stage S81 of routine 80, engine controller 50 (FIG. 1) receives and stores throttle position signal $TP_S$ (FIG. 1), engine speed signal $ES_S$ (FIG. 1), transmission speed signal $TS_S$ (FIG. 1), vehicle speed signal $VS_S$ (FIG. 1), and transmission operation signal $TO_S$ (FIG. 1) in memory 51, and then proceeds to stage S82. In stage S82 of routine 80, CPU 52 determines if transmission operation signal $TO_S$ is indicating that transmission 27 (FIG. 1) is in either park or neutral? If CPU 52 determines that transmission operation signal $TO_S$ is indicating transmission 27 is in park or neutral, then CPU 52 returns to START and awaits the next period in which to execute routine 80. If CPU 52 determines that transmission operation signal $TO_S$ is not indicating transmission 27 is in park or neutral, then CPU 52 proceeds to stage S83 of routine 80 to determine if transmission operation signal $TO_S$ is indicating that there is an error in transmission speed signal $TS_S$. If CPU 52 determines that transmission operation signal $TO_S$ is not indicating an error in transmission speed signal $TS_S$, then CPU 52 proceeds to stage S84 of routine 80 to compute an engine speed limit signal $SL_S$ as a function (f) of throttle position signal $TP_S$ and transmission speed signal $TS_S$. In one embodiment, a map or look-up table of engine speed limit signal $SL_S$ as related to throttle position signal $TP_S$ and transmission speed signal $TS_S$ is stored within memory 51, and the appropriate value for engine speed limit signal $SL_S$ is retrieved therefrom by CPU 52.

Figure 4B:
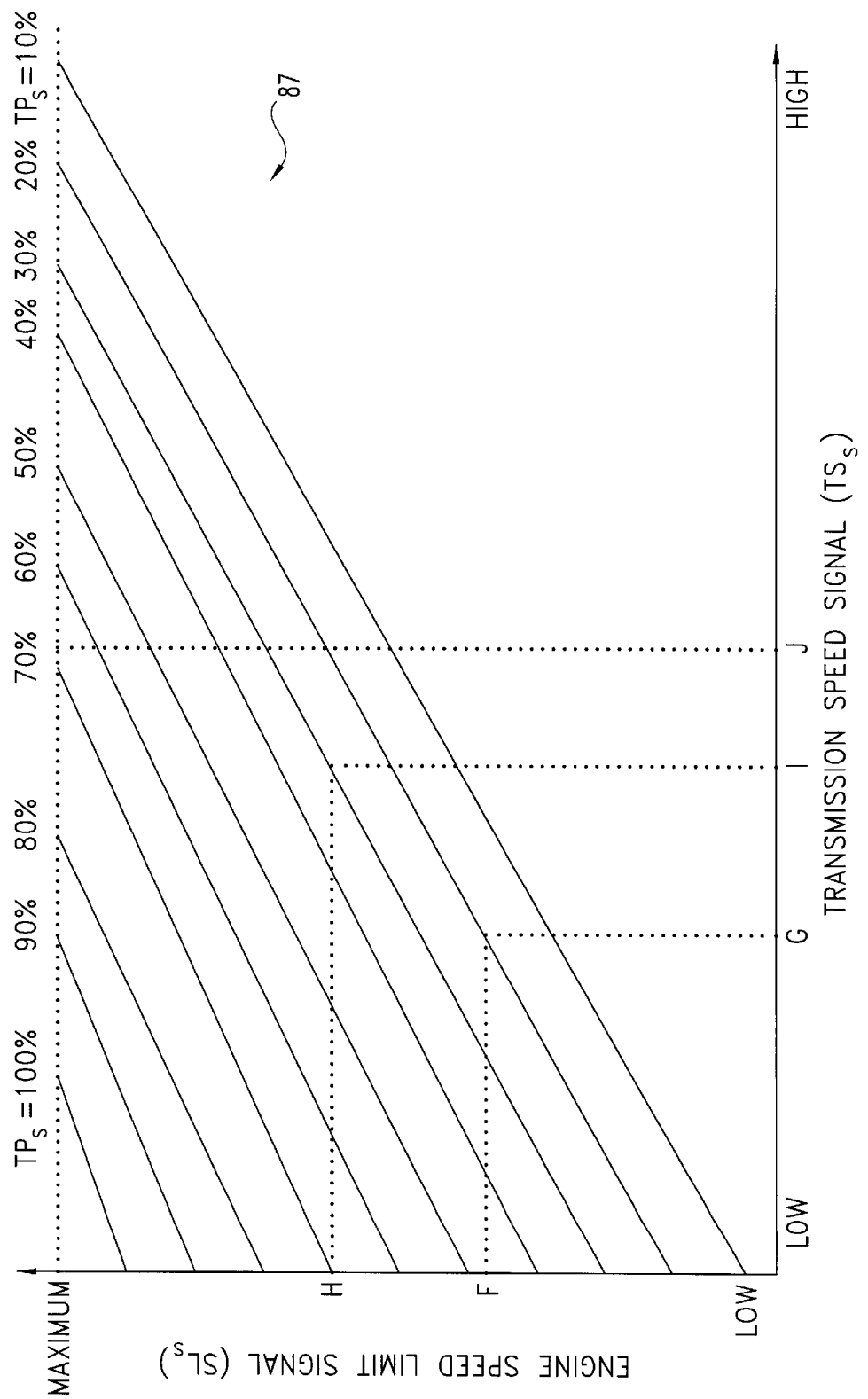
FIG. 4B is a graphical view of one embodiment in accordance with the present invention of a series of different throttle position curves, each presented in terms of engine speed versus transmission speed.

A graphical view illustrating a map 87 is shown in FIG. 4B. Referring to FIG. 4B, map 87 has transmission speed signal $TS_S$ taken along the abscissa (x axis) and engine speed limit signal $SL_S$ taken along the ordinate (y axis). A plurality of throttle position curves in multiples of 10% are shown. More or fewer throttle position curves can be provided in alternative embodiments of map 87. Each throttle curve slopes diagonally and upwardly until it reaches a maximum level for engine speed limit signal $SL_S$. CPU 52 retrieves a value for engine speed limit signal $SL_S$ in response to the detected levels for throttle position signal $TP_S$ and transmission speed signal $TS_S$. By way of example, engine speed limit signal $SL_S$ is retrieved by CPU 52 at a level F when throttle position signal $TP_S$ indicates throttle valve 26 (FIG. 1) is opened by 20% and transmission speed signal $TS_S$ is at a level G. Also by example, engine speed limit signal $SL_S$ is retrieved by CPU 52 at a level H when throttle position signal $TP_S$ indicates throttle valve 26 is opened by 30% and transmission speed signal $TS_S$ is at a level I. Another example is a retrieval of engine speed limit signal $SL_S$ by CPU 52 at the maximum level for engine speed limit signal $SL_S$ when throttle position signal $TP_S$ indicates throttle valve 26 is opened by 70% or higher, and transmission speed signal $TS_S$ is at a level J.

Referring back to FIG. 4A, if CPU 52 determines that transmission operation signal $TO_S$ is indicating an error in transmission speed signal $TS_S$, then CPU 52 proceeds to stage S85 of routine 80 to conventionally compute transmission speed signal $TS_S$ as a function (f) of vehicle speed signal $VS_S$ and a tire size calibration signal $TSC_S$ that is conventionally derived from a ratio between a diameter of wheel 28a (FIG. 1) and a diameter of drive axle 29a (FIG. 1). Tire size calibration signal $TSC_S$ is stored within memory 51 at a constant value and retrieved therefrom by CPU 52. CPU 52 subsequently proceeds to stage S84 of routine 80 to compute engine speed limit signal $SL_S$ as a function (f) of throttle position signal $TP_S$ and the computed transmission speed signal $TS_S$. Computed transmission speed signal $TS_S$ substitutes for the received transmission speed signal $TS_S$ during the computation for engine speed limit signal $SL_S$ as previously described herein in connection with FIG. 4B.

Upon completion of stage S84 of routine 80, CPU 52 proceeds to stage S86 of routine 80 to direct a high speed governor routine (not shown) to compute fueling meter signal $FM_{S3}$ as a function (f) of engine speed limit signal $SL_S$. The high speed governor routine is a conventional routine stored within memory 51. It is to be appreciated that fueling subsystem 22 supplies fuel to engine 21 as indicated by fueling meter signal $FM_{S3}$ to apply a corresponding engine torque to torque converter 27a of transmission 27 (FIG. 1) that is within the maximum torque limit of converter 27a.

Figure 5:
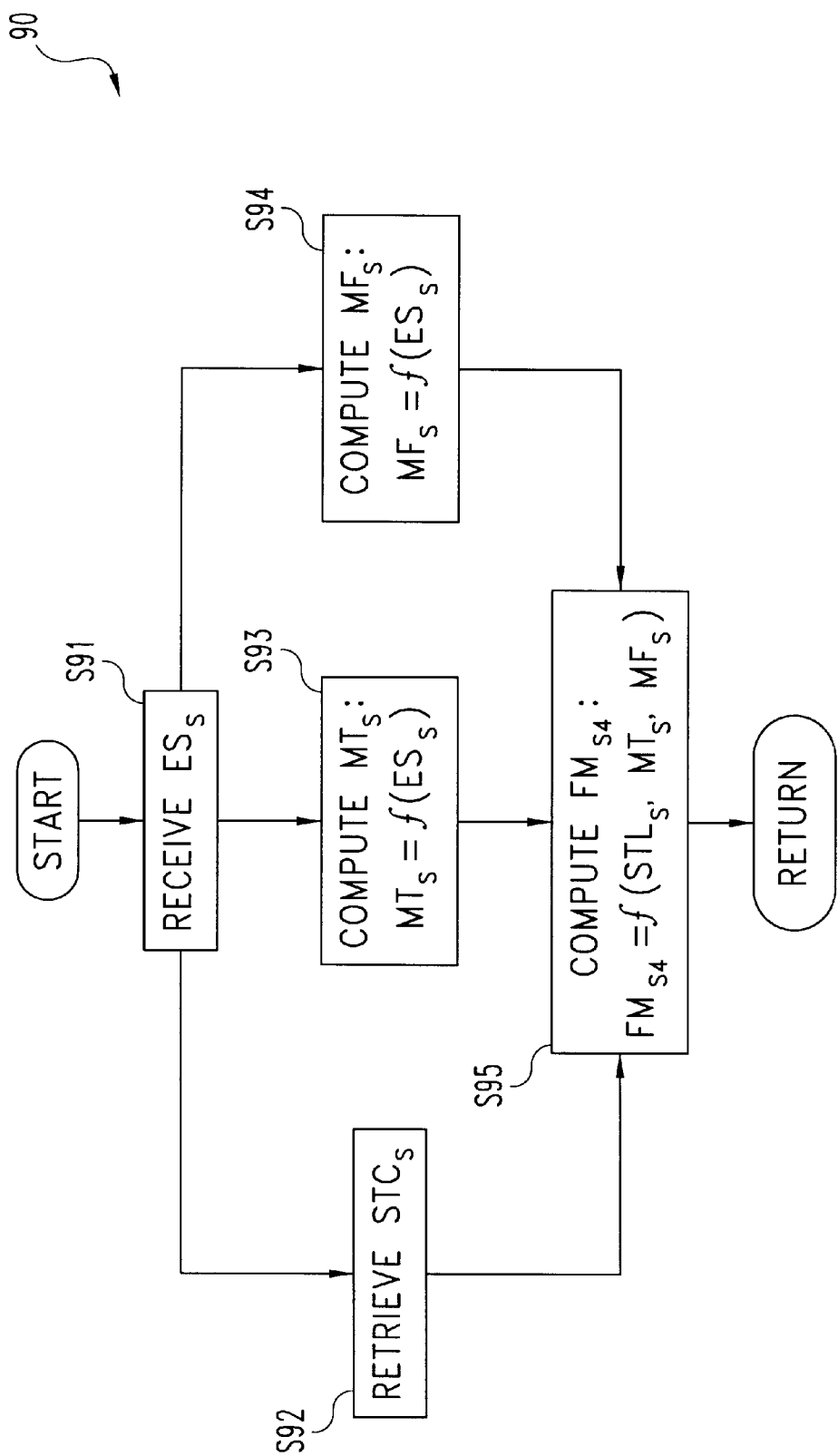
FIG. 5 is a flow chart illustrating a propeller shaft/drive axle based torque management routine as executed by the engine controller of the FIG. 1 system.

Referring to FIGS. 1 and 4A, for an alternative embodiment where transmission controller 40 and engine controller 50 are integrated into one controller or as part of a computer, transmission condition signal $TC_S$ can be received by the one controller or the computer in lieu of transmission operation signal $TO_S$. Routine 80 is then executed as previously described herein with the substitution of transmission condition signal $TC_S$ for transmission operation signal $TO_S$. Referring to FIG. 5, a preferred embodiment of propeller shaft/drive axle based torque management routine 90 (FIG. 2) as stored in memory 51 (FIG. 1) and executed by CPU 52 (FIG. 1) will now be described herein. In stage S91 of routine 90, engine controller 50 receives and stores engine speed signal $ES_S$ (FIG. 1) in memory 51, and then concurrently proceeds to stage S92, stage S93, and stage S94 of routine S90. In stage S92 of routine 90, CPU 52 retrieves a shaft torque calibration signal $STC_S$ from memory 51. Shaft torque calibration signal $STC_S$ is indicative of the lowest maximum torque capacity between and among propeller shaft 29a (FIG. 1) and drive axle 29b (FIG. 1). In stage S93 of routine 90, CPU 52 computes maximum torque signal $MT_S$ as previously described herein in connection with the description of FIG. 3C. Alternatively, CPU 52 can retrieve maximum torque signal $MT_S$ from memory 51 as computed by routine 70 during stage S75 of FIG. 3A. In stage S94 of routine 90, CPU 52 computes maximum fuel signal $MF_S$ as previously described herein in connection with the description of FIG. 3D. Alternatively, CPU 52 can retrieve maximum fuel signal $MF_S$ from memory 51 as computed by routine 70 during stage S76 of FIG. 3A.

Upon completion of stage S92, stage S93 and stage S94, CPU 52 proceeds to stage S95 of routine 90 to compute fuel metering signal $FM_{S4}$ as a function (f) of shaft torque calibration signal $STC_S$, maximum torque signal $MT_S$, and maximum fuel signal $MF_S$. In one embodiment, fueling meter signal $FM_{S4}$ is computed during stage S95 in accordance with the following equation (2):

$$FM_{S4}=(STC_S/MT_S)* MF_S \qquad (2)$$

It is to be appreciated that fueling subsystem 22 supplies fuel to engine 21 in accordance with fueling meter signal $FM_{S4}$ to correspondingly apply an engine torque to torque converter 27a of transmission 27 (FIG. 1) that is within the torque capacities of propeller shaft 29a and drive axle 29b.

Figure 6:
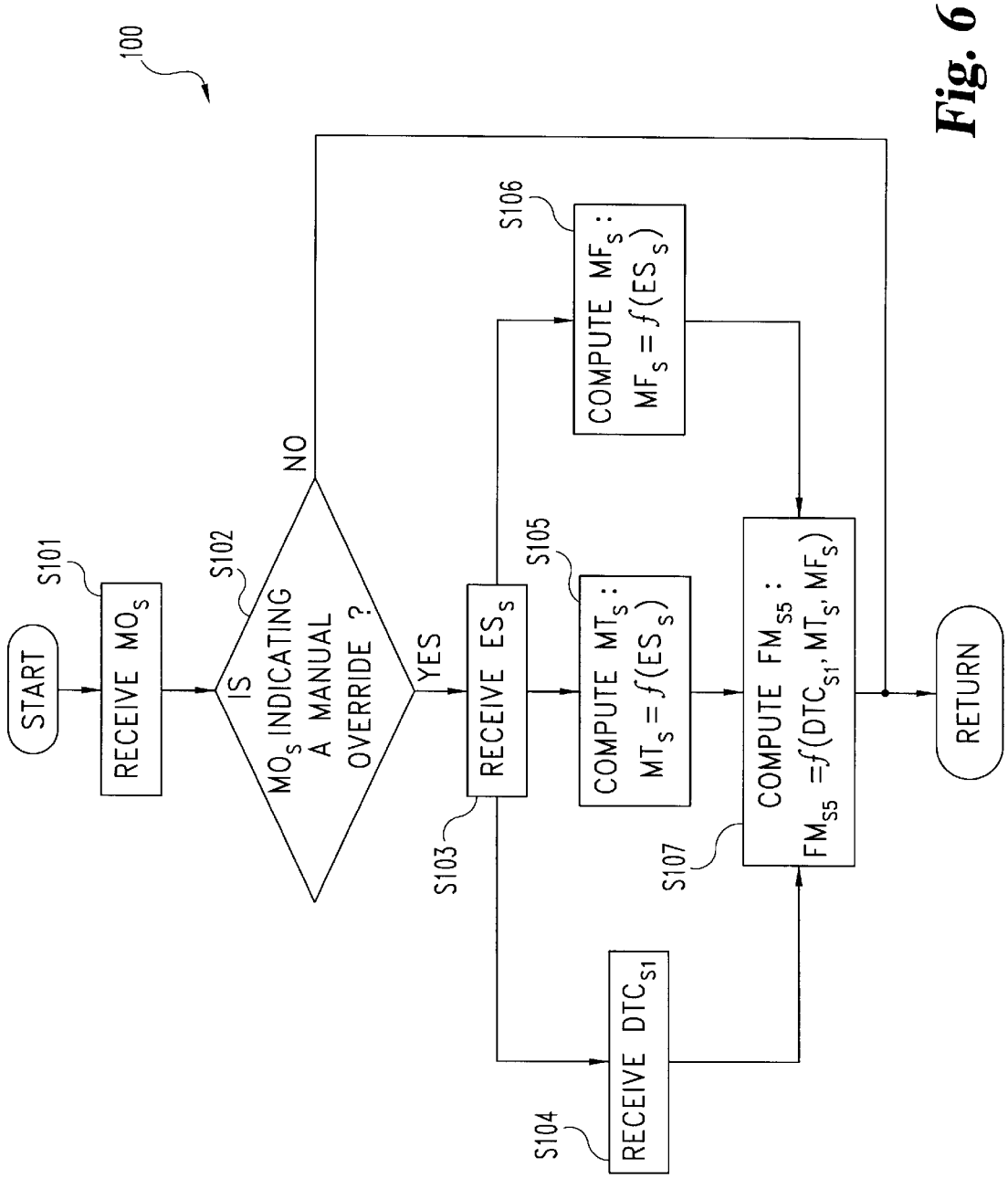
FIG. 6 is a flow chart illustrating a manual control based torque management routine as executed by the engine controller of the FIG. 1 system.

Referring to FIG. 6, a preferred embodiment of manual control based torque management routine 100 (FIG. 2) as stored in memory 51 (FIG. 1) and executed by CPU 52 (FIG. 1) will now be described herein. In stage S101 of routine S100, engine controller 50 receives a manual override signal $MO_S$ via LAN 44 (FIG. 1). Manual override signal $MO_S$ is indicative of whether an operator of a vehicle housing drivetrain 20 (FIG. 1) has a manual control switch (not shown) in an OFF position or in an ON position. CPU 52 then proceeds to stage S102 of routine 100 to determine which position of the manual control switch is being indicated by manual override signal $MO_S$. If CPU 52 determines that manual override signal $MO_S$ is indicating the manual control switch is in the OFF position, then CPU 52 returns to start and awaits the next period in which to execute routine 100. If CPU 52 determines that manual override signal $MO_S$ is indicating the manual control switch is in the ON position, then CPU 52 proceeds to stage S103 of routine S100 to receive and store engine speed signal $ES_S$ (FIG. 1) in memory 51. Upon completion of stage S103, CPU concurrently proceeds to stage S104, stage S105 and stage 106. In stage S104 of routine 100, CPU 52 retrieves drivetrain torque calibration signal $DTC_{S1}$ from memory 51. Drivetrain torque calibration signal $DTC_{S1}$ represents a calibrated torque for drivetrain 20 (FIG. 1) that is either a set or mapped value. In stage S105 of routine 100, CPU 52 computes maximum torque signal $MT_S$ as previously described in connection with FIG. 3C. Alternatively, CPU 52 can retrieve maximum torque signal $MT_S$ from memory 51 as computed by routine 70 during stage S75 of FIG. 3A. In stage S106 of routine 100, CPU 52 computes maximum fuel signal $MF_S$ as previously described in connection with FIG. 3D. Alternatively, CPU 52 can retrieve maximum fuel signal $MF_S$ from memory 51 as computed by routine 70 during stage S76 of FIG. 3A.

Upon completion of stage S104, stage S105 and stage S106, CPU 52 proceeds to stage S107 to compute fuel metering signal $FM_{S5}$ as a function (f) of drivetrain torque calibration signal $DTC_{S1}$, maximum torque signal $MT_S$, and maximum fuel signal $MF_S$. In one embodiment, fueling meter signal $FM_{S5}$ is computed during stage S107 in accordance with the following equation (3):

$$FM_{S5}=(DTC_{S1}/MT_S)* MF_S \qquad (3)$$

It is to be appreciated that fueling subsystem 22 supplies fuel to engine 21 in accordance with fueling meter signal $FM_{S5}$ to generate an engine torque that is within the torque capacities of torque converter 27a, the gears of transmission 27, propeller shaft 29a (FIG. 1), drive axle 29b (FIG. 1), and any additional downstream components (not shown) of drivetrain 20 (FG. 1).

Figure 7:
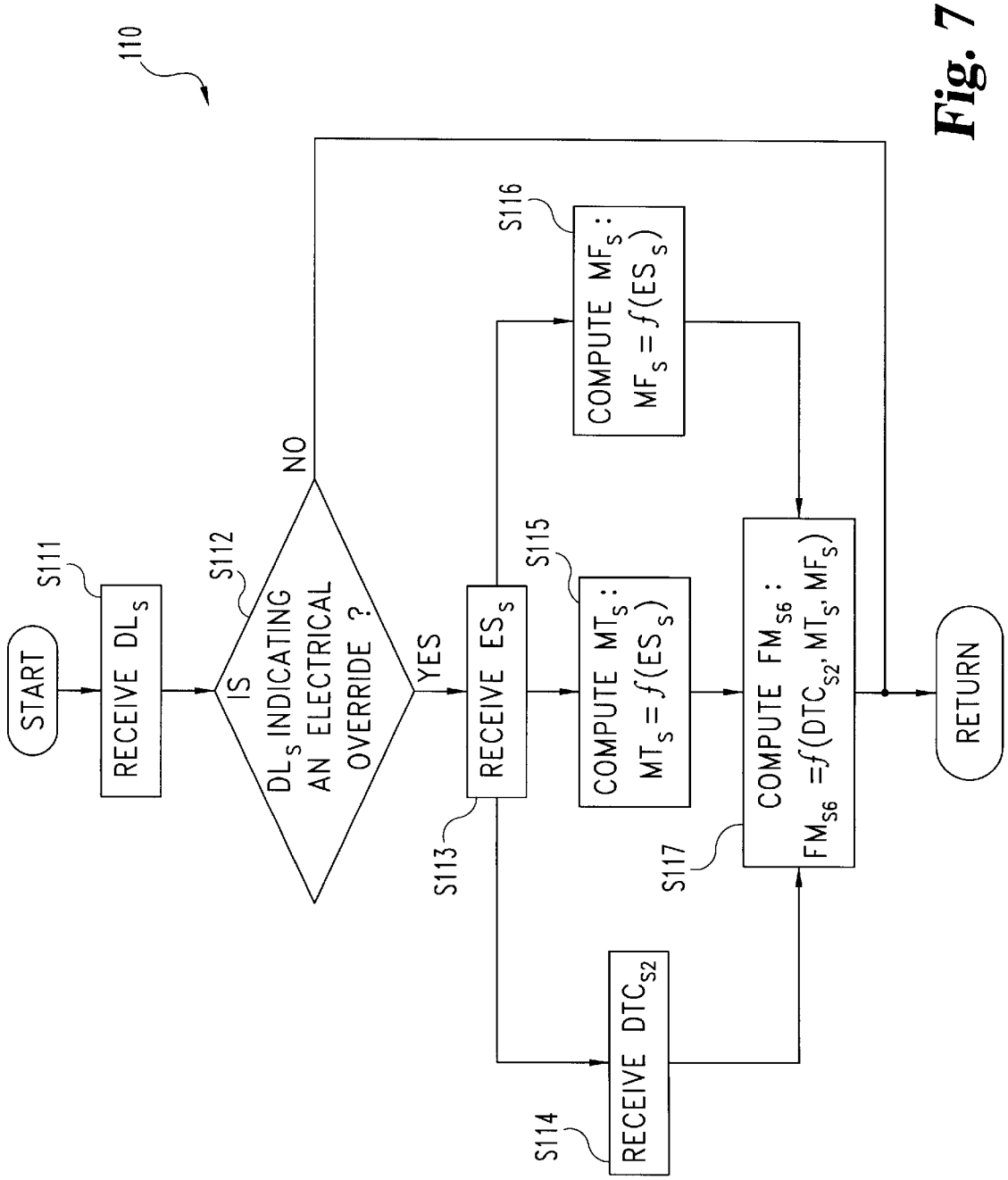
FIG. 7 is a flow chart illustrating a data link based torque management routine as executed by the engine controller of the FIG. 1 system.

Referring to FIG. 7, a preferred embodiment of data link based torque management routine 110 (FIG. 2) as stored in memory 51 (FIG. 1) and executed by CPU 52 (FIG. 1) will now be described herein. In stage S111 of routine 110, engine controller 50 receives a data link $DL_S$ via LAN 44 (FIG. 1). Data link signal $DL_S$ indicates whether the common ECU or any other controller like transmission controller 40 (FIG. 1) requests to set the maximum torque for engine 21 (FIG. 1). CPU 52 then proceeds to stage S112 to determine if data link signal $DL_S$ indicates an electrical override is being requested by the common ECU or any other controller. If CPU 52 determines that data link signal $DL_S$ is not indicating an electrical override, then CPU 52 returns to start and awaits the next period in which to execute routine 110. If CPU 52 determines that data link signal $DL_S$ is indicating an electrical override, then CPU 52 proceeds to stage S113 to receive and store engine speed signal $ES_S$ (FIG. 1) in memory 51.

Upon completion of stage S113, CPU concurrently proceeds to stage S114, stage S115 and stage 116. In stage S114 of routine 110, CPU 52 retrieves driveshaft torque calibration signal $DTC_{S2}$ from memory 51. Drivetrain torque calibration signal $DTC_{S2}$ represents a calibrated torque for drivetrain 20 (FIG. 1) that is either a set or mapped value. In stage S115 of routine 110, CPU 52 computes maximum torque signal $MT_S$ as previously described in connection with FIG. 3C. Alternatively, CPU 52 can retrieve maximum torque signal $MT_S$ from memory 51 as computed by routine 70 during stage S75 of FIG. 3A. In stage S116 of routine 110, CPU 52 computes maximum fuel signal $MF_S$ as previously described in connection FIG. 3D. Alternatively, CPU 52 can retrieve maximum fuel signal $MF_S$ from memory 51 as computed by routine 70 during stage S76 of FIG. 3A.

Upon completion of stage S114, stage S115 and stage S116, CPU 52 proceeds to stage S117 to compute fuel metering signal $FM_{S6}$ as a function (f) of drivetrain torque calibration signal $DTC_{S2}$, maximum torque signal $MF_S$, and maximum fuel signal $MF_S$. In one embodiment, fueling meter signal $FM_{S6}$ is computed during stage S117 in accordance with the following equation (4):

$$FM_{S6} = (DTC_{S2}/MT_S) * MF_S \qquad (4)$$

It is to be appreciated that fueling subsystem supplies fuel to engine 21 in accordance with fueling meter signal $FM_{S6}$ to generate an engine torque (FIG. 1) that is within the torque capacities of torque converter 27a, the gears of transmission 27, propeller shaft 29a (FIG. 1), drive axle 29b (FIG. 1), and any additional downstream components (not shown) of drivetrain 20 (FIG. 1).

Referring again to FIG. 2, in another embodiment of an engine torque control routine in accordance with the present invention, propeller shaft/drive axle based torque management routine 90, manual control based torque management routine 100, and data link based torque management routine 110 are omitted. For such an embodiment, torque curve A and torque curve B of map 87 (FIG. 4B) can be downwardly adjusted in view of the maximum torque capacities of propeller shaft 29a (FIG. 1) and drive axle 29b (FIG. 1).

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A vehicle comprising:
   a drivetrain including
     an internal combustion engine having a first output shaft,
     a transmission operatively connected to said first output shaft, said transmission having a plurality of gear ratios, and
     a rotating propulsion member operatively coupled to said transmission; and
   a control system for managing a torque of said drivetrain, said control system including
     a first sensor providing an engine speed signal indicative of a rotational speed of said first output shaft,
     a second sensor providing a vehicle speed signal indicative of a rotational speed of said rotating propulsion member, and
     a controller responsive to said engine speed signal and said vehicle speed signal to generate a gear ratio signal as an indication of an engaged gear ratio of said plurality of gear ratios, a torque limit signal as an indication of a torque limit of said engaged gear ratio, a maximum torque signal as an indication of a maximum torque that is transmittable by said output shaft to said transmission, a maximum fuel signal as an indication of a maximum quantity of fuel required for said output shaft to transmit said maximum torque to said transmission, and a first fueling meter signal as an indication of a first quantity of fuel to be supplied to said internal combustion engine,
     wherein first fueling meter signal is determined as a function of said torque limit signal, said maximum torque signal, and said maximum fuel signal.

2. The vehicle of claim 1 wherein
   said drivetrain further includes an air intake passage in fluid communication with said internal combustion engine, said air intake passage having a throttle valve rotatably coupled therein, said throttle valve being positionable between a first rotational position and a second rotational position;
   said transmission further has a second output shaft operatively coupled to said rotating propulsion member;
   said control system further includes
     a third sensor providing a throttle position signal indicative of a rotational position of said throttle valve, and
     a fourth sensor providing a transmission speed signal indicative of a rotational speed of said second output shaft; and
   said controller is responsive to said throttle position signal and said transmission speed signal to generate an engine speed limit signal as an indication of a maximum rotational speed of said first output shaft.

3. The vehicle of claim 2 wherein said controller generates a second fueling meter signal as a function of said engine speed limit signal, said second metering signal being an indication of a second quantity of fuel to be supplied to said internal combustion engine.

4. The vehicle of claim 3 wherein said controller generates a third fueling meter signal corresponding to a lowest quantity of fuel to be supplied to the internal combustion engine as indicated by said first fueling meter signal or by said second fueling meter signal.

5. The vehicle of claim 1 wherein said drivetrain further includes an air intake passage in fluid communication with said internal combustion engine, said air intake passage having a throttle valve rotatably coupled therein, said throttle valve being positionable between a first rotational position and a second rotational position;

said transmission further has a second output shaft operatively coupled to said rotating propulsion member;

said control system further includes a third sensor for providing a throttle position signal indicative of a rotational position of said throttle valve;

said controller is responsive to said vehicle speed signal to generate a transmission speed signal as an indication of a rotational speed of said second output shaft; and said controller is responsive to said throttle position signal and said transmission speed signal to generate an engine speed limit signal as an indication of a maximum rotational speed of said first output shaft.

6. The vehicle of claim 5 wherein said controller generates a second fueling meter signal as a function of said engine speed limit, said second metering signal being an indication of a second quantity of fuel to be supplied to said internal combustion engine.

7. The vehicle of claim 6 wherein said controller generates a third fueling meter signal that indicates a quantity of fuel to be supplied to the internal combustion engine equal to the lower of said first quantity of fuel and said second quantity of fuel.

8. A vehicle comprising:

a drivetrain including
 an internal combustion engine having a first output shaft,
 a transmission operatively connected to said first output shaft, said transmission having a plurality of gear ratios, and
 a rotating propulsion member operatively coupled to said transmission; and a control system for managing a torque of said drivetrain, said control system including
 a first sensor providing an engine speed signal indicative of a rotational speed of said first output shaft,
 a second sensor providing a vehicle speed signal indicative of a rotational speed of said rotating propulsion member,
 a means for providing a gear ratio signal indicative of an engaged gear ratio of said plurality of gear ratios, and
 a controller responsive to said engine speed signal, said vehicle speed signal, and said gear ratio signal to generate a torque limit signal as an indication of a torque limit of said engaged gear ratio, a maximum torque signal as an indication of a maximum torque that is transmittable by said output shaft to said transmission, a maximum fuel signal as an indication of a maximum quantity of fuel required for said output shaft to transmit said maximum torque to said transmission, and a first fueling meter signal as an indication of a first quantity of fuel to be supplied to said internal combustion engine,
 wherein said first fueling meter signal is determined as a function of said torque limit signal, said maximum torque signal, and said maximum fuel signal.

9. The vehicle of claim 8 wherein said drivetrain further includes an air intake passage in fluid communication with said internal combustion engine, said air intake passage having a throttle valve rotatably coupled therein, said throttle valve being positionable between a first rotational position and a second rotational position;

said transmission further has a second output shaft operatively coupled to said rotating propulsion member;

said control system further includes
 a third sensor for providing a throttle position signal indicative of a rotational position of said throttle valve, and
 a fourth sensor for providing a transmission speed signal indicative of a rotational speed of said second output shaft; and said controller is responsive to said throttle position signal and said transmission speed signal to generate an engine speed limit signal as an indication of a maximum rotational speed of said first output shaft.

10. The vehicle of claim 9 wherein said controller generates a second fueling meter signal as a function of said engine speed limit signal, said second fueling meter signal being an indication of a second quantity of fuel to be supplied to said internal combustion engine.

11. The vehicle of claim 10 wherein said controller generates a third fueling meter signal indicating a quantity of fuel equal to the lower of said first quantity of fuel and said second quantity of fuel.

12. The vehicle of claim 8 wherein said drivetrain further includes an air intake passage in fluid communication with said internal combustion engine, said air intake passage having a throttle valve rotatably coupled therein, said throttle valve being positionable between a first rotational position and a second rotational position;

said transmission further has a second output shaft operatively coupled to said rotating propulsion member;

said control system further includes a third sensor for providing a throttle position signal indicative of a rotational position of said throttle valve;

said controller is responsive to said vehicle speed signal to generate a transmission speed signal as an indication of a rotational speed of said second output shaft; and said controller is responsive to said throttle position signal and said transmission speed signal to generate an engine speed limit signal indicative of a maximum rotational speed of said first output shaft.

13. The vehicle of claim 12 wherein said controller generates a second fueling meter signal as a function of said engine speed limit, said second fueling meter signal being an indication of a second quantity of fuel to be supplied to said internal combustion engine.

14. The vehicle of claim 13 wherein said controller generates a third fueling meter signal that indicates a quantity of fuel equal to the lower of said first quantity of fuel and said second quantity of fuel.

15. A method for managing a torque of a drivetrain, the drivetrain including an air intake passage having a throttle valve rotatably coupled therein, the throttle valve being positionable between a first rotational position and a second rotational position, an internal combustion engine having a first output shaft, and a transmission operatively connected to the first output shaft, the transmission having a plurality of gear ratios and a second output shaft, said method comprising:

detecting a rotational speed of the first output shaft;
providing a gear ratio signal as an indication of an engaged gear ratio of the plurality of gear ratios;

generating a torque limit signal as a function of said gear ratio signal and said detected rotational speed of the first output shaft, said torque limit signal being an indication of a torque limit of said engaged gear ratio, generating a maximum torque signal as a function of said detected rotational speed of the first output shaft, said maximum torque signal being an indication of a maximum torque that is transmittable by said first output shaft to said transmission;

generating a maximum fuel signal as a function of said detected rotational speed of the first output shaft, said maximum fuel signal being an indication of a maximum quantity of fuel required for said first output shaft to transmit said maximum torque to said transmission; and generating a first fueling meter signal as a function of said torque limit signal, said maximum torque signal, and said maximum fuel signal, said first fueling meter signal being an indication of a first quantity of fuel to be supplied to said internal combustion engine.

16. The method of claim 15 further comprising:

detecting a rotational position of the throttle valve;

detecting a rotational speed of the second output shaft; and generating an engine speed limit signal as a function of said detected rotational position of the throttle valve and said detected rotational speed of the second output shaft, said engine speed limit signal being an indication of a maximum rotational speed of said first output shaft.

17. The method of claim 16 further comprising generating a second fueling meter signal as a function of said engine speed limit signal, said second fueling meter signal being an indication of a second quantity of fuel to be supplied to the internal combustion engine.

18. The method of claim 16 further comprising generating a third fueling meter signal, said third fueling meter signal indicating a quantity of fuel to be supplied to the internal combustion engine equal to the lower of said first quantity of fuel and said second quantity of fuel.

19. The method of claim 15 further comprising:

detecting a rotational speed of the rotating propulsion member,
wherein said gear ratio signal is generated as a function of said detected rotational speed of the first output shaft and the detected rotational speed of the rotating propulsion member.

20. A vehicle comprising:

a drivetrain including
an internal combustion engine having a first output shaft,
a transmission including an engaged gear ratio, a second output shaft, and a torque converter operatively connected to said first output shaft, and
a rotating propulsion member operatively coupled to said drive axle; and a control system for managing a torque of said drivetrain, said control system including
a controller to generate a first fueling meter signal as an indication of a first quantity of fuel to be supplied to said internal combustion engine, a second fueling meter signal as an indication of a second quantity of fuel to be supplied to said internal combustion engine, and a third fueling meter signal as a function of said first fueling meter signal and said second fueling meter signal,
wherein said first fueling meter signal is a function of a maximum torque capacity of said engaged gear of said transmission, and said second fueling meter signal is a function of a maximum torque capacity of said torque converter.

21. The vehicle of claim 20 wherein said drivetrain further includes a propeller shaft operatively connecting said second output shaft to said rotating propulsion member; and said controller generates a fourth fueling meter signal as an indication of a third quantity of fuel to be supplied to said internal combustion engine, said fourth fueling meter signal being a function of a maximum torque capacity of said propeller shaft, said third fueling meter signal being a lowest fueling meter signal between and among said first fueling meter signal, said second fueling meter signal, and said fourth fueling meter signal.

22. The vehicle of claim 20 wherein said drivetrain further includes a drive axle operatively connecting said second output shaft to said rotating propulsion member; and said controller generates a fourth fueling meter signal as an indication of a third quantity of fuel to be supplied to said internal combustion engine, said fourth fueling meter signal being a function of a maximum torque capacity of said drive axle, said third fueling meter signal being a lowest fueling meter signal between and among said first fueling meter signal, said second fueling meter signal, and said fourth fueling meter signal.

23. The vehicle of claim 20 wherein said drivetrain further includes
a propeller shaft operatively connecting said second output shaft, and
a drive axle operatively connecting said propeller shaft to said rotating propulsion member; and said controller generates a fourth fueling meter signal as an indication of a third quantity of fuel to be supplied to said internal combustion engine, said fourth fueling meter signal being a function of a lowest maximum torque capacity between and among said propeller shaft and said drive axle, said third fueling meter signal being a lowest fueling meter signal between and among said first fueling meter signal, said second fueling meter signal, and said fourth fueling meter signal.

24. The vehicle of claim 20 wherein said controller generates a fourth fueling meter signal as an indication of a third quantity of fuel to be supplied to said internal combustion engine, said fourth fueling meter signal being a function of a calibrated maximum torque capacity for said drivetrain, said third fueling meter signal being a lowest fueling meter signal between and among said first fueling meter signal, said second fueling meter signal, and said fourth fueling meter signal.

25. A method for managing a torque of a drivetrain, the drivetrain including an internal combustion engine having a first output shaft, a transmission including an engaged gear, a second output shaft, and a torque converter operatively connected to said first output shaft, and a rotating propulsion member operatively coupled to said drive axle, said method comprising:

generating a first fueling meter signal as an indication of a first quantity of fuel to be supplied to said internal combustion engine, said first fueling meter signal being a function of a maximum torque capacity of said engaged gear of said transmission;

generating a second fueling meter as an indication of a second quantity of fuel to be supplied to said internal combustion engine, and said second fueling meter signal being a function of a maximum torque capacity of said torque converter; and selecting the one of said first fueling meter signal and said second fueling meter signal that corresponds to a lesser amount of fuel.

26. The method of claim 25 wherein the drivetrain further includes a propeller shaft operatively connecting said second output shaft to said rotating propulsion member; and further comprising generating a fourth fueling meter signal as an indication of a third quantity of fuel to be supplied to said internal combustion engine, said fourth fueling meter signal being a function of a maximum torque capacity of said propeller shaft, said third fueling meter signal being a lowest fueling meter signal between and among said first fueling meter signal, said second fueling meter signal, and said fourth fueling meter signal.

27. The method of claim 25 wherein the drivetrain further includes a drive axle operatively connecting said second output shaft to said rotating propulsion member; and further comprising generating a fourth fueling meter signal as an indication of a third quantity of fuel to be supplied to said internal combustion engine, said fourth fueling meter signal being a function of a maximum torque capacity of said drive axle, said third fueling meter signal being a lowest fueling meter signal between and among said first fueling meter signal, said second fueling meter signal, and said fourth fueling meter signal.

28. The method of claim 25 wherein said drivetrain further includes a propeller shaft operatively connected to said second output shaft, and a drive axle operatively connecting said propeller shaft to said rotating propulsion member; and further comprising generating a fourth fueling meter signal as an indication of a third quantity of fuel to be supplied to said internal combustion engine, said fourth fueling meter signal being a function of a lowest maximum torque capacity between and among said propeller shaft and said drive axle, said third fueling meter signal being a lowest fueling meter signal between and among said first fueling meter signal, said second fueling meter signal, and said fourth fueling meter signal.

29. The method of claim 25 further comprising generating a fourth fueling meter signal as an indication of a third quantity of fuel to be supplied to said internal combustion engine, said fourth fueling meter signal being a function of a calibrated maximum torque capacity for said drivetrain, said third fueling meter signal being a lowest fueling meter signal between and among said first fueling meter signal, said second fueling meter signal, and said fourth fueling meter signal.

* * * * *